Sept. 30, 1952 R. C. MERRY 2,612,085
APPARATUS FOR ASSEMBLING PARTITIONS FOR PACKING CELLS
Filed Sept. 22, 1948 7 Sheets-Sheet 2
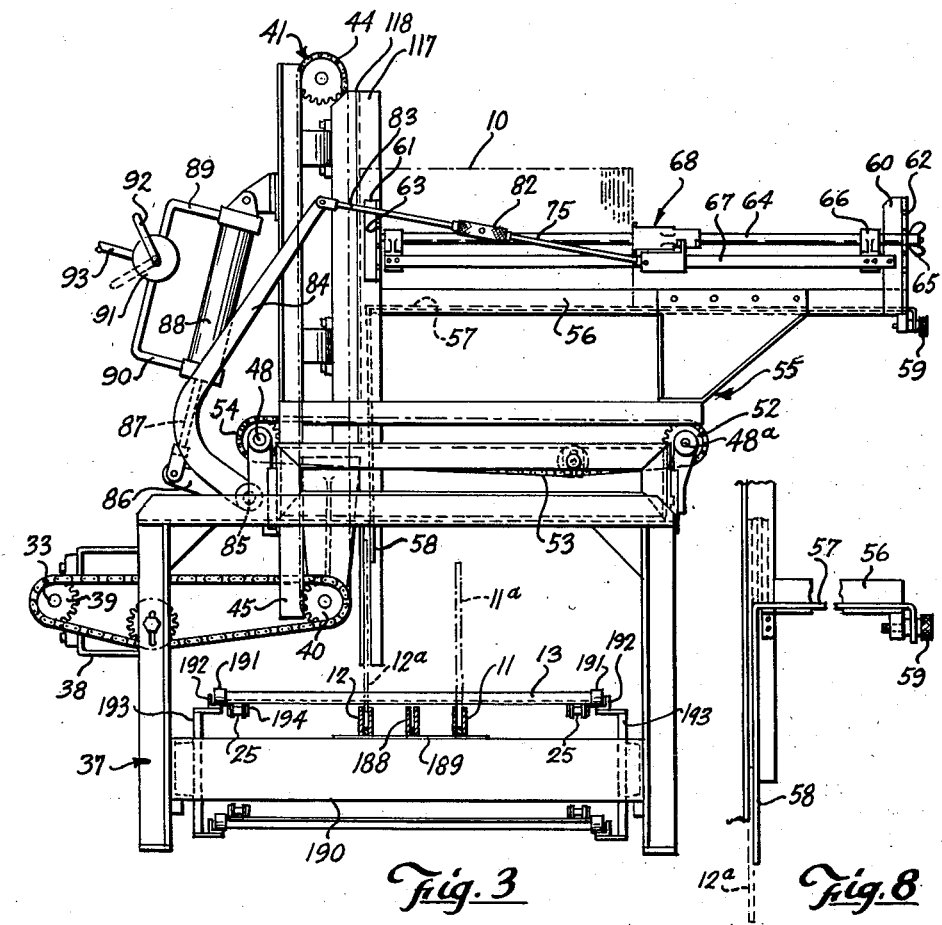
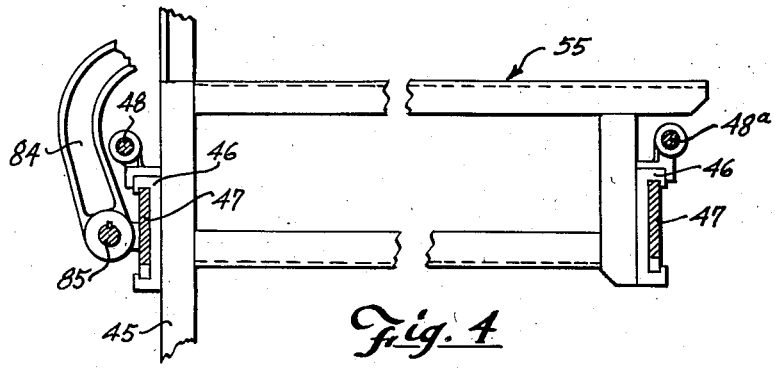
INVENTOR
R.C. MERRY
By: Fetherstonhaugh & Co.
ATT'YS Sept. 30, 1952             R. C. MERRY             2,612,085

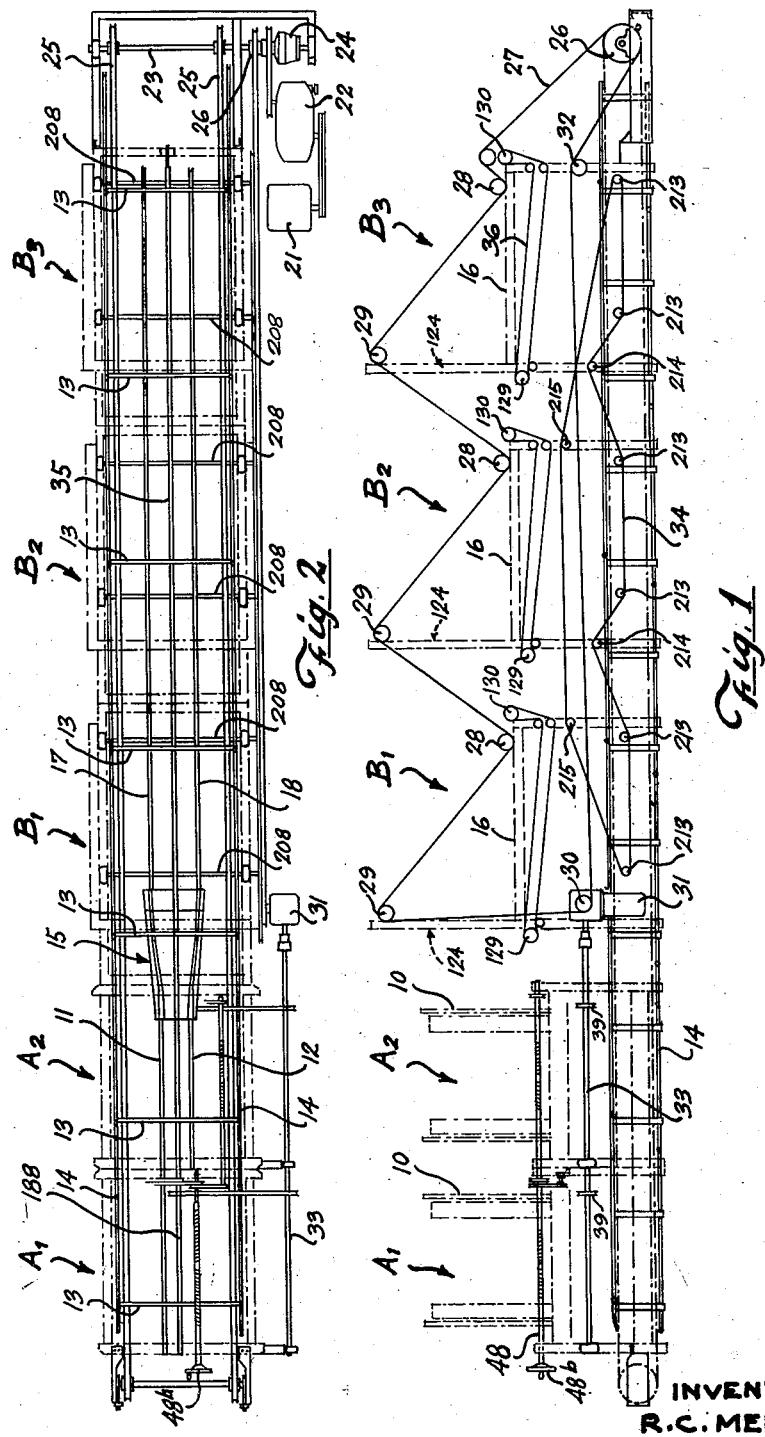

APPARATUS FOR ASSEMBLING PARTITIONS FOR PACKING CELLS

Filed Sept. 22, 1948             7 Sheets-Sheet 3

INVENTOR
R.C. MERRY
By: Fetherstonhaugh & Co.
ATT'YS

Sept. 30, 1952 R. C. MERRY 2,612,085
APPARATUS FOR ASSEMBLING PARTITIONS FOR PACKING CELLS
Filed Sept. 22, 1948 7 Sheets-Sheet 4
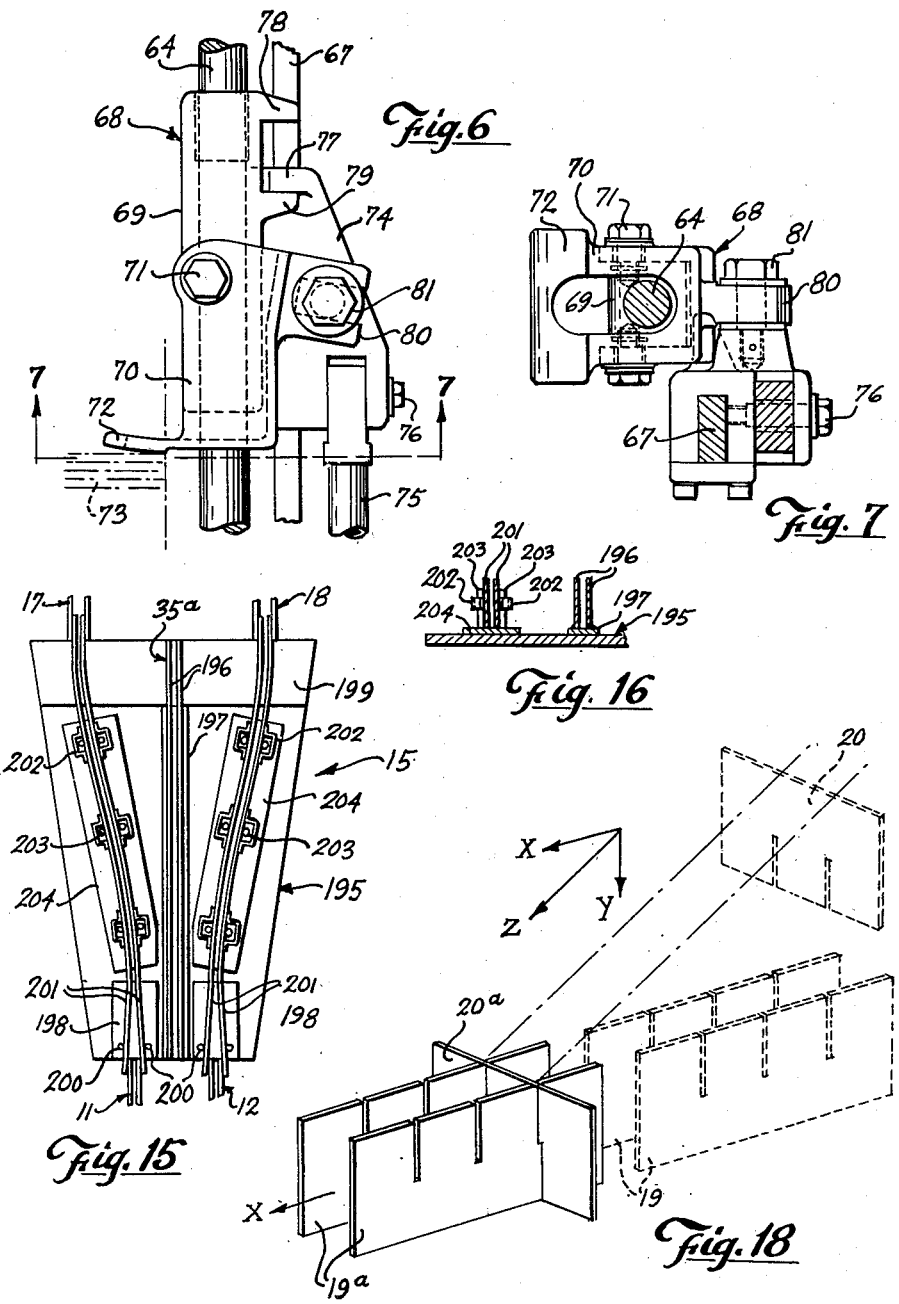
INVENTOR
R.C. MERRY
By: Fetherstonhaugh & Co.
ATT'YS

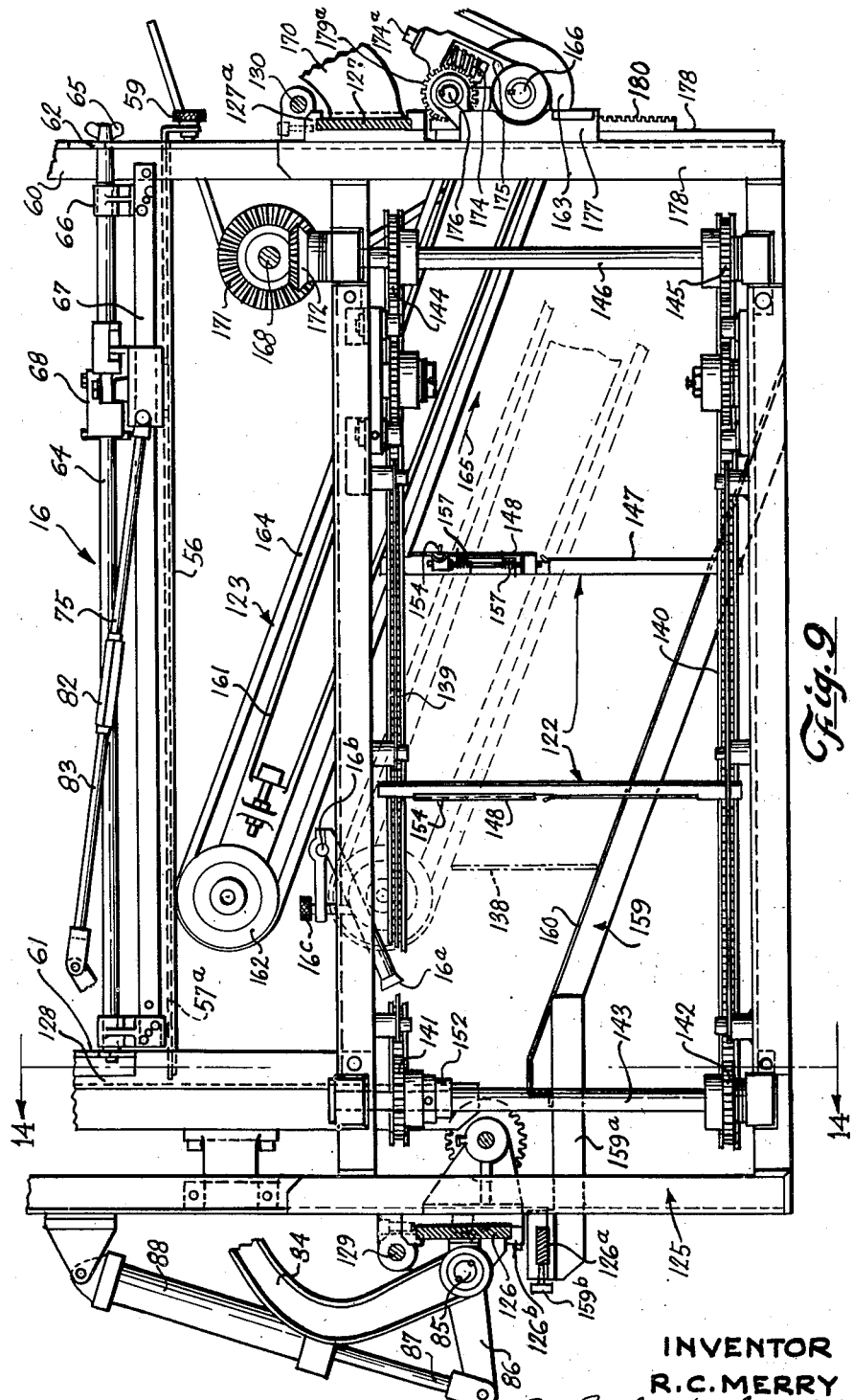

Sept. 30, 1952  R. C. MERRY  2,612,085
APPARATUS FOR ASSEMBLING PARTITIONS FOR PACKING CELLS
Filed Sept. 22, 1948  7 Sheets-Sheet 6
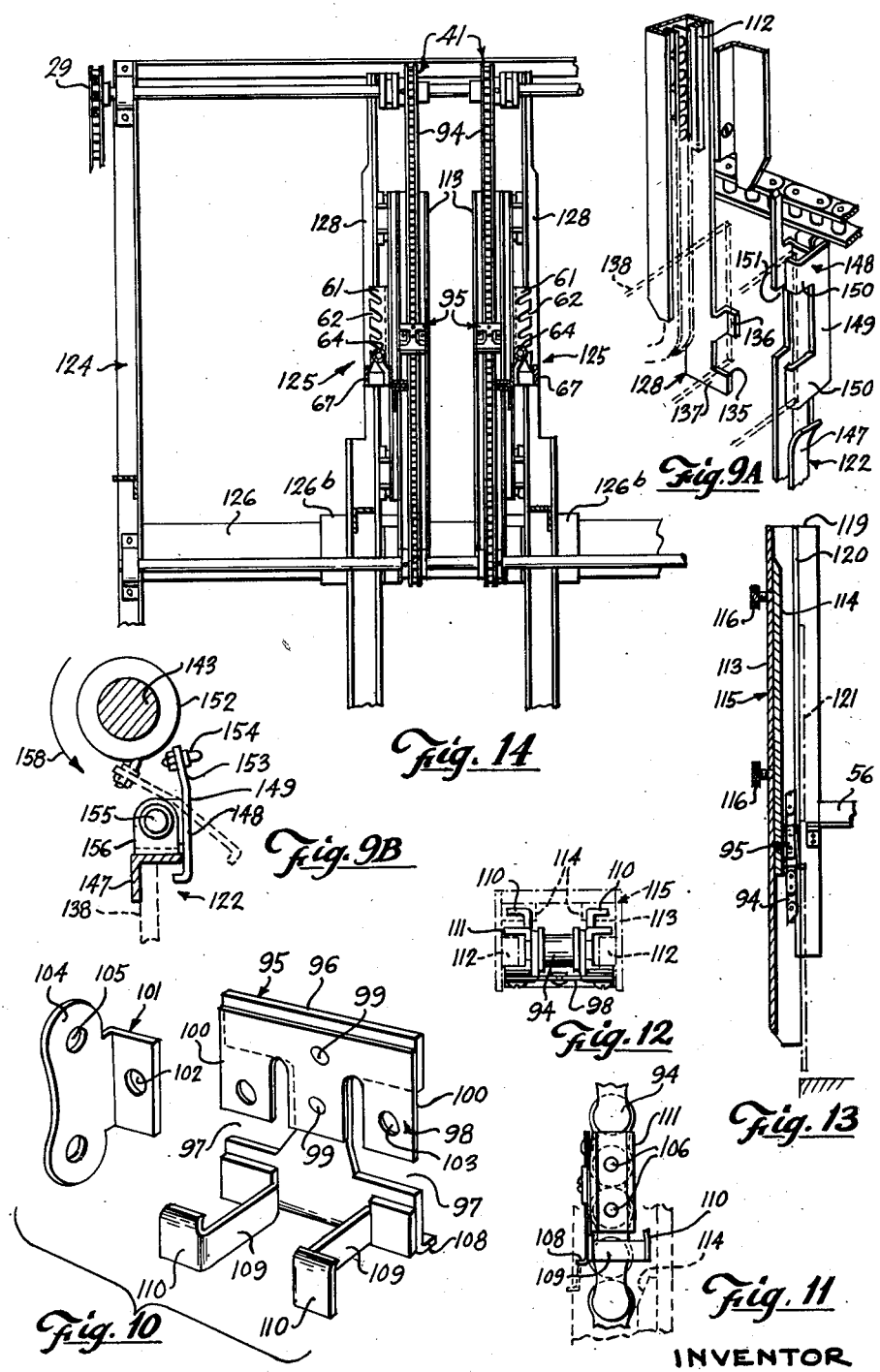
INVENTOR
R. C. MERRY
By: Fetherstonhaugh & Co.
ATT'YS

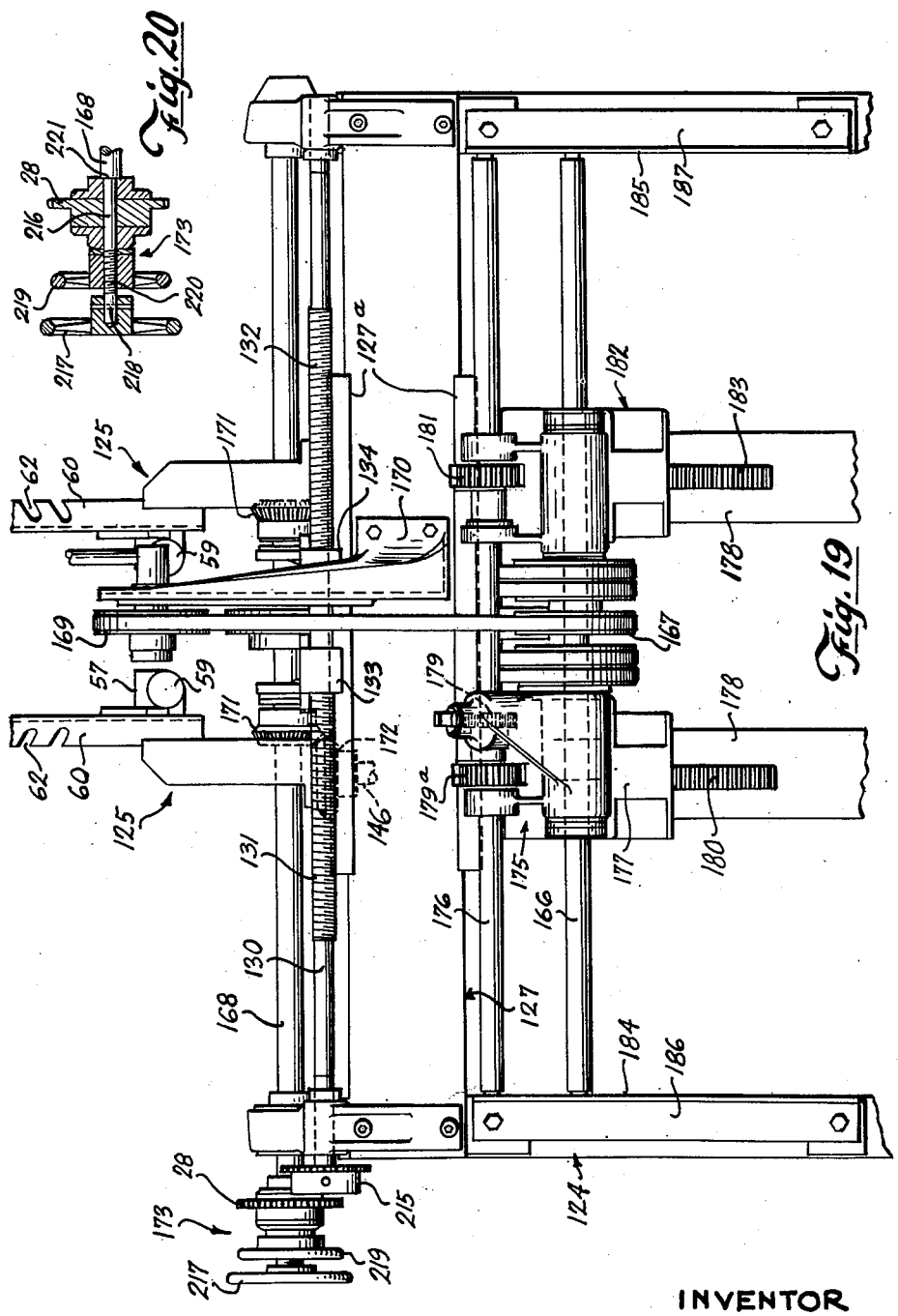

Patented Sept. 30, 1952

2,612,085

UNITED STATES PATENT OFFICE 2,612,085

APPARATUS FOR ASSEMBLING PARTITIONS FOR PACKING CELLS

Richard C. Merry, Oakville, Ontario, Canada

Application September 22, 1948, Serial No. 50,494

7 Claims. (Cl. 93—37)

This invention relates to a partition assembling machine.

Packing cells for bottled beverages, eggs, and other articles are made by assembling partition blanks which have been notched usually from one longitudinal edge thereof to a point about mid-way between the edges; so that when the notched portion of one blank is fitted into that of another, and all the notches of all the blanks are occupied, the cell is completed.

Formerly, machines have been devised for assembling cells of this character but in all instances where continuous movement has been attempted in the assembling portion, including the disposal of the formed cell, it has been necessary to change the direction of movement either of the cell after assembly or of the partitions before or during the assembly operations. The lack of appreciation of these characteristics has resulted in undue complications in the design of many prior machines but most important a singular disadvantage attends in prior machines with regard to the time required to change the machine over from assembling one size of cell with a certain number of partitions to a different size of cell having the same or different dimensions. Although some prior machines have certain adjustments whereby such change may be undertaken, it is necessary to re-synchronize the various movements of the whole machine and this consumes a considerable amount of time from those machines now used in this particular field. The time required for change-over usually is about one day and at least a matter of hours.

It is an object of the present invention to provide a partition or cell assembling machine which is comprised of a number of simple units which may be added or subtracted from the complete arrangement as desired, the units concerned being mainly a partition feeding unit designed to feed partitions to a through path conveyor. A number of the partition feeding units may be placed in series along the through path to feed a plurality of partitions for conveyance along the path in parallel spaced apart relation. These units are hereinafter referred to as the A unit or the partition feeding unit. A cross-partition feeding unit is utilized in conjunction with a partition feeding unit and is designed to feed the cross-partitions in continuous motion into the partitions fed by the unit A as they are conveyed along a through path. The cross-partition feeding units are each referred to hereinafter as unit B and may be placed in series along the through path wherein each unit feeds one partition for a complete cell. The whole machine therefore, is comprised of a plurality of units A and B mounted in series along a through path and corresponding in number to the number of partitions and cross-partitions desired in the final assembled cell.

Another object of the invention is to provide a machine comprised of units of the above character in which each unit includes a magazine for feeding the partitions and wherein the feeding mechanism incorporated in the magazine applies a constant pressure for feeding the partitions and including means freely releasable from the stacked partitions in the magazine whereby further partitions may be inserted from the latter without effecting the operation of the feeding mechanism.

A further object of the invention is to provide cell assembling units of the above character having magazines which are adjustable to accommodate various sizes of partitions.

A still further object of the invention is to provide a cell assembling machine comprised of at least one partition feeding unit and at least one cross-partition feeding unit wherein the units are synchronized one with respect to the other and the synchronizing mechanism is adjustable by means included in the cross-partition feeding unit.

A still further object of the invention is to provide a machine of the above character wherein the cross-partition feeding unit includes continuous feeding means for feeding the cross-partitions toward the partitions conveyed along the through path at the same velocity as these latter partitions but gradually being urged toward them so that the cross-partitions are assembled with those being conveyed along the through path without interrupting the continuous movement of the latter.

A still further object of the invention is to provide a selector for extracting a partition from a magazine of either of the types of units above referred to which is adjustable for various thicknesses of partition material.

A still further object of the invention is to provide track coupling means for coupling the track means which are embodied in the through path conveying means between a partition feeding unit and a cross-partition feeding unit, the latter units being adjustable to dispose the partitions carried along the through path in adjustable spaced apart relation.

With these and other objects in view the invention relates to method and apparatus for assembling cross-partitions with the longitudinal partitions in predetermined spaced apart relationship. The longitudinal partitions are moved at a certain velocity along the through path and means are utilized for feeding cross-partitions at a forward velocity in the direction of movement of the longitudinal partitions at the same forward velocity as the latter and simultaneously means act for urging the cross-partitions at another velocity in a direction toward the forwardly moving longitudinal partitions to assemble the same in continuous motion.

Other objects of the invention will be appreciated by a study of the following specification taken in conjunction with the accompanying drawings.

In the drawings,

Figure 1 is a diagrammatic elevation of a machine comprised of two partition feeding units placed in series and three cross-partition feeding units placed in series wherein each of these units feeds a single partition for assembly with the others of the other units to complete the formation of a cell unit. In this connection, it will be understood hereinafter that the word "cell" will be applicable to describe a plurality of partitions and cross-partitions making up a complete structure and that the word "cell" will also extend to defining a structure comprised of a single partition assembled with one other partition transversely with respect thereto.

Figure 2 is a diagrammatic plan view of the units of Figure 1 illustrating the through path for the partitions.

Figure 3 is an elevation of a partition feeding unit, that is to say, units A1 or A2 of Figure 1, which may simply be referred to as unit A in some instances.

Figure 4 is a partial view of certain details of Figure 3.

Figure 6 is a plan view of a magazine feeding dog having distinctive characteristics to be hereinafter more fully described in conjunction with the magazine mechanism as a whole whereby further partitions may be placed into the magazine without materially effecting the pressure applied against those remaining in the magazine, the mechanism as a whole facilitating greatly the replenishment of partitions in the magazine.

Figure 7 is cross-sectional view on line 7—7 of Figure 6.

Figure 8 is a partial view of partition supporting means in the feeding mechanism of the A unit of Figure 3.

Figure 9 is a side elevation with portions cut away for clarity of a secondary frame portion of a cross-partition feeding unit B corresponding generally to each of the units B1, B2, or B3 of Figure 1.

Figure 9a is a partial perspective view of mechanism involved in feeding cross-partitions from the magazine of the B unit to the means for conveying the partition forward at same forward velocity as the longitudinal partitions.

Figure 9b is a plan sectional detail illustrating actuation of the gate member in the cross-partition forward conveying means of the B unit.

Figure 10 is a partially exploded perspective view of the selector employed for the selecting of a single partition from each of the magazines of units A or B.

Figure 11 is a partial view of the assembly of the selector with the drive means therefor, and Figure 12 is another view illustrating guide means used in conjunction with the selector.

Figure 13 is a partial sectional view of the selector and adjustable means employed for adjusting same to select different thicknesses of partitions from a magazine.

Figure 14 is a sectional view of the device of Figure 9 on the line 14—14.

Figure 15 is a plan view of track or guide coupling means for coupling the through guide device of an A unit to the through guide device of a B unit.

Figure 16 is a partial sectional view of the device of Figure 15.

Figure 17:
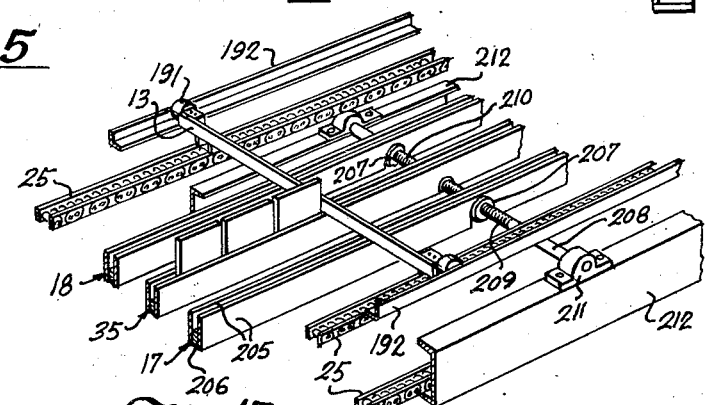

Figure 17 is a partial perspective view of the through path guide means illustrating the conveyor mechanism employed.

Figure 18 is an illustrative perspective of the method employed for assembling the partitions and the cross-partitions.

Figure 19 is an end view of the B unit of Figure 9.

Figure 20 is a partial sectional view of the synchronizing adjusting means on the B unit.

Referring to the drawings and particularly Figures 1 and 2, apparatus according to the invention is shown schematically illustrating the placement of units A and B in series in a continuous through path. The units A1 and A2 feed longitudinal partitions from the magazines 10 down into the parallel spaced apart guides 11 and 12. The arrangement shown is intended to be utilized for the assembly of a cell having two longitudinal partitions. The guides 11 and 12 constitute in part through path conveying means and cooperate with transverse rods 13 moving thereover and connected at their ends to the endless chains 14 which extend along either side of the complete apparatus. After the longitudinal partitions have fallen into the guides 11 and 12, a rod 13 will cause the same to be urged forwardly along the guides and through adjustable coupling unit 15 to units B1, B2 and B3 successively.

Each of the units B includes a magazine 16 supporting cross-partitions in a transverse manner and designed to deposit same toward the forwardly moving longitudinal partitions in the guides 17 and 18.

In order to illustrate the function accomplished by the units B, it is necessary to refer to Figure 18 wherein the longitudinal partitions 19 are shown moving in the direction of arrow X. A cross-partition 20 is fed by a magazine of a unit B to conveying means designed to carry the same forward in the direction X at the same forward velocity as the predetermined or certain velocity of forward movement of the longitudinal partitions 19. Means are also included in the unit B (not shown here) for urging the cross-partition 20 downwardly as illustrated by the vector Y simultaneous with its forward movement so that the resultant movement is in a direction Z. The two directions of movement of the cross-partition 20 therefore cause the same to be gradually inserted into the partitions 19 until the same reaches the assembled position indicated by numerals 19a and 20a. Each unit B only feeds one cross-partition into the forwardly moving longitudinal partitions as they are urged along the guides 17 and 18.

In Figure 1 the drive arrangement is shown schematically and comprises a drive motor 21 which is in drive connection with a conventional change-speed device 22 which in turn drives the main drive shaft 23 through a clutch mechanism 24. The shaft 23 carries suitable sprockets driving the conveying chains 25 which extend throughout the length of the complete apparatus and carry the transverse rods 13 which will be described hereinafter in more detail with reference to Figure 17. The main drive sprocket 26 is also mounted on the shaft 23 and carries the drive chain 27 which passes over the sprockets 28 and 29 of each B unit and about the sprocket 30 of the gear box 31 and returns over the idler 32. A drive shaft 33 extends from the gear box 31 which is of unity gear ratio to drive the A units in a manner to be described in more detail hereinafter. A continuous chain 34 inter-connects all B units for adjustment of the distance between the guides 17 and 18 relative to the central guide 35. The chains 36 on each B unit are utilized in connection with the adjustment of the magazine thereof with regard to the width of cross-partitions being handled. The units of the complete arrangement will now be described in detail.

*Longitudinal partition feeding units*

The unit A is comprised of a suitable frame 37 mounting the brackets 38, carrying drive shaft 33, which by its sprockets 39 drives the drive sprocket 40 of the endless chain selector 41 which selects one longitudinal partition at a time from the magazine 10. Thus in Figure 5 the sprocket 40 is shown mounted on shaft 42 which in turn mounts sprockets 43 carrying the endless chains 44 in upstanding relation relative to the frame 37. The shaft 42 and the endless chain selector device are mounted on separate frames 45 which are supported by brackets 46 (see also Figures 3 and 4) on the crossbars 47 of the main frame. Adjusting bar 48 having right- and left-hand threads 49 and 50 engaging in brackets 51 of each upstanding frame 45 is movable manually to cause these frames to move toward or away from one another thereby to adjust the unit for handling various lengths of longitudinal partition. A shaft 48a of similar character is also included on the magazine end of the unit and carries the sprocket 52 which in turn carries the adjusting chain 53 passing around the sprocket 54 of the shaft 48 so that the manual movement of one shaft will cause corresponding movement of the other.

Magazine mechanism of the magazine 10 is comprised of a frame construction 55 forming a part of and extending from the upstanding frame 45 and including the parallel spaced apart tracks 56 carrying the adjustable "shoe bars" 57 which terminate in the downwardly extending presser strap 58 as is illustrated in more detail in Figure 8. The shoe bars terminate in spaced apart relationship to the endless chain selectors 41 and therefore are adjustable for various thicknesses of partition as is illustrated in the adjusting thumb screw 59. The tracks 56 mount the upstanding brackets 60 at the one end and brackets 61 are mounted adjacent the other end on the upstanding frames 45 substantially as illustrated in Figure 3. These brackets have downwardly sloping slots 62 and 63 respectively in which the supporting rod 64 is hung and fastened by the thumb screw 65. The rod 64 rigidly supports brackets 66 which carry the guide bar 67.

In each of the units A and B I incorporate my novel design of magazine feeding dog which is mounted on the rod 64 and guide bar 67 and is shown in more detail in Figures 6 and 7.

The feeding dog 68 is comprised of a slidable body 69 slidably mounted on a rod 64 and carrying the reciprocable dog 70 pivotally mounted by the bolt 71 thereto and having the engaging stud 72 extending for insertion between and engagement with partitions 73. A collar block 74 slidably mounted on the guide bar 67 is actuated in its longitudinal movement therealong by the link 75 pivotally connected thereto by the bolt 76. The collar block has a flange 77 which extends upwardly between the fingers 78 and 79 of the body 69. The reciprocable dog 70 presents the forked portion 80 which is slidably connected by the bolt 81 which extends upwardly from the collar block 74. Thus in Figure 6 movement of the collar block so that the flange 77 moves toward the finger 78 causes counter-clockwise swinging movement of the reciprocable dog 70 until the engaging stud 72 is free of the partition 73 and the flange 77 engages the finger 78 forcing the body 69 along the rod 64.

Figure 5:
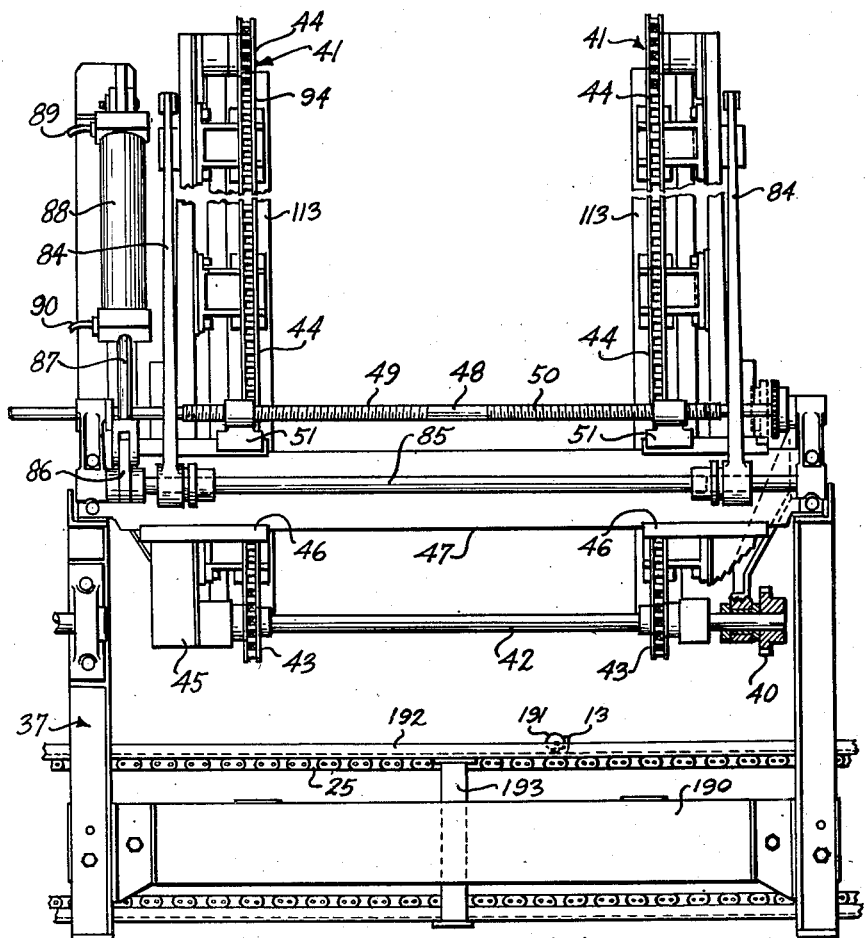
Figure 5 is an end view of the A unit of Figure 3, that is to say, the partition feeding unit illustrating certain of the means by which the unit may be adjusted to accommodate various sizes of partitions.

As illustrated in Figure 3 the link 75 connects through the adjusting sleeve 82 of the arm 83 to the lever arm 84 which is slidably keyed to the shaft 85, the latter being rotated through the link 86 by the piston arm 87 of the double-acting pneumatic pressure cylinder 88 (see also Figure 5). A portion of the latter is illustrated diagrammatically in Figure 3 and the same is fed compressed air through the alternative lines 89 or 90 from the four-way valve 91 which is actuable by the valve actuating member 92 to cause air from the supply line 93 to actuate the pressure cylinder in the desired manner, the operation of such devices being well-known to skilled persons.

*Magazine feed*

In both units A and B the magazine feed is similar insofar as the endless chain selectors are concerned and which are indicated generally by numeral 41 in each case (see Figures 3 and 5 for the A unit and Figures 13 and 14 for the B unit). Referring to these figures and also Figures 10, 11 and 12, it will be noted that the chain selectors each comprise an endless chain 94 mounted on the sprockets as illustrated wherein the chain carries a selector 95 (see Figure 14) comprised of a body 96 having cut-away portions 97 on either side thereof and mounting the resilient member 98 preferably made from sheet spring steel and riveted thereto by means of rivets 99. The resilient member has resilient arms 100 extending therefrom to mount the brackets 101 by suitable bolts or rivets through the holes 102 and 103. Each bracket has a flange portion 104 having holes 105 to accommodate the link rivets 106 of the chain 94. The other end of the body 96 is turned outwardly to form a selector dog 108, and guide means 109 in the form of U-shaped members extend in the opposite direction therefrom in spaced apart relationship as illustrated to present the shoes 110 to a controlling surface.

As illustrated in Figures 11 and 12 longitudinally extending U-shaped brackets 111 are fastened over the brackets 104 by rivets 106 and are disposed for slidable engagement with guide tracks 112 within the guide chutes 113. As illustrated in Figure 13 each guide chute includes a cam member 114 adjustably mounted relative to the back wall 115 by the manual adjusting screws 116 and which is disposed to be engaged by the shoes 110 of the selector as the latter passes thereover in its downward travel. Since the guide tracks 112 fix the axial disposition of the U-shaped guides or members 111 within the brackets 101 and resilient members 98, the body 96 resiliently pivots on these members 98 to allow the selector dog 108 to be urged outwardly as the shoes pass over the surface of the cam member 114 as illustrated in dotted lines in Figure 11. The adjustment of the cam member 114 determines the outward movement of the selector dog which may thereby be limited to engage the upper edge of one partition only. In Figure 3 it will be noted that a portion of the upstanding frame is comprised of the angle pieces 117 which have inwardly extending flanges 118 and in the B unit the construction is similar as seen in Figures 13 and 14 wherein the angle pieces 119 have inwardly extending flanges 120. In both instances, these inwardly extending flanges serve to support the partitions in the magazine against pressure applied by the feeding dog 68 but the pressure only serves to hold the next partition to be selected (as indicated in Figure 13 by numeral 121) against these flanges since the shoe bars 57 (or 57a of Unit B of Figure 9) terminate in spaced apart relationship to the flanges 118 or 120 as the case may be so that the selector 95 by engaging the upper edge of the partition may cause the same to move downwardly. After the partition is free of the other partitions in the magazine it may tend to fall away from the flanges 118 or 120 and in such instance, I prefer to employ means for retaining the partitions against these flanges as the same drop from the magazine toward the guides or other partitions as the case may be. In the unit A these means are found in the form of the downwardly extending presser strap 58 formerly described but in the B unit an alternative is illustrated in the embodiment of a compressed air stream directed toward the face of the partition in a manner yet to be described.

*Cross-partition feeding units*

The cross-partition feeding units or units B are all similar in construction and the preferable form of each is illustrated in Figures 9, 14 and 19. In general, the B unit includes the magazine 16 and means for feeding a cross-partition received from the magazine at a forward velocity equal to the certain velocity of longitudinal partitions passing along the through path or guide means longitudinally of the unit and at another velocity toward the longitudinal partitions, these feeding means comprising the conveying means 122 and the depressing means 123.

Structurally, the B unit is generally comprised of a main frame 124 within which is carried a pair of secondary frames, each of which is of the form illustrated in Figure 9 and indicated by numeral 125. The main frame carries transversely thereof the crossbars 126, 127 and 126a upon which are mounted the secondary frames 125 by means of the slidable shoe plates 126b and 127a. The secondary frames include the upstanding magazine frames 128, the secondary frames being bodily movable laterally to determine their spaced apart relation for the accommodation of various sizes of cross-partition in the magazine 16 and the conveying means 122 and depressing means 123. Adjusting rods 129 and 130 having opposed threads 131 and 132, as illustrated for the rod 130 in Figure 19, engage in the collars 133 and 134 of the secondary frames 125 for adjustment purposes, the rods 129 and 130 being operatively related by chain drive connection in the chain 36 illustrated in Figure 1. The magazine 16 is similar in construction to the magazine of the unit A formerly described and requires no comment other than drawing attention to Figure 9a illustrating the manner in which a cross-partition, after being drawn from the magazine, is allowed to fall downwardly to rest upon the supporting shoulder 135 to have its ends engaged by the engaging flange 136 of the downward extension 137 of the upstanding frame 128. In this position the cross-partition is indicated by the chain lines 138 and the same is so held until it is picked up by the conveying means 122.

Referring also to Figure 9, the conveying means of the B unit comprise the endless chain 139 and 140 mounted on the sprockets 141 and 142 of upstanding shaft 143 and the sprockets 144 and 145 of upstanding drive shaft 146. Chains 139 and 140 mount a suitable number of cross-partition receiving members 147 which are in the form of channels of U-shaped cross section mounted so as to present the inner walls of the U toward the edges of the cross-partition when the receiving member is being carried forwardly on the inner loops of the chains. The receiving members mount gate members 148 which are illustrated in more detail in Figures 9a and 9b and are comprised of the body 149 having flanges 150 with a cut-away portion therebetween for passage past the flange 136. The receiving member 147, it will be noted, also is cut away as at 151 for the same purpose. As the receiving member 147 passes around the hub 152 of sprocket 141, the extending arm 153 is deflected by engagement of its adjustable stud 154 with the surface of the hub 152. As illustrated, the body 149 is pivotally mounted on the pivot 155 mounted in brackets 156, extending from the receiving member 147, and suitable springs 157 (see Figure 9) are utilized to normally urge the body 149 to the closed or normal position illustrated in bold lines in Figure 9b.

Obviously, therefore, as the receiving member is conveyed about the sprocket 141 toward the inward loops of the chains 139 and 140, as illustrated by the direction of arrow 158 in Figure 9b, the gate 148 will be caused to open so that the receiving member may be free to pass over the end of the partition 138 and as the receiving member continues to move forward the stud 154 is released allowing the gate to close entrapping the cross-partition within the channel formation of the receiving member and moving the same forwardly away from the shoulder support 135 after which the cross-partition is free to drop within the receiving members as the same proceed forward.

Figure 9a illustrates a detail of the feeding mechanism which is adjustably independent of the secondary frame assembly shown, but which is included to illustrate operative relationship and structural location. In the unit B1 it is desirable to include some means for guiding the upper edges of longitudinal partitions proceeding along the guides 17 and 35 so that they will be held truly vertical in their forward movement. To this end the inclined guide means 159 having upper flanges 160 are included wherein the latter also serve as a means for controlling the downward movement of cross-partition 138 being conveyed toward the longitudinal partitions which are progressing forwardly in a path which is beneath the secondary frame 125 illustrated in Figure 9. The guide means 159 are suspended at one end by frame 159a or crossbar 126a, the lower extremities of same being connected to the guide means 17, 18 and 35. Although in some instances, the force of gravity may be sufficient to cause a cross-partition to drop into the receiving members 147 as they are carried forward, I prefer to include the depressing means 123 which are inclined as illustrated to positively urge the partitions into nesting engagement with the longitudinal partitions.

The depressing means 123 are comprised of the inclined frame piece 161 mounting the pulley wheels 162 and 163 over which passes the continuous belt 164. The underloop of each moves in a forward direction as indicated by the arrow 165 and which is given this forward movement by drive connection through pulley 163 slidably keyed to shaft 166 carrying the pulley wheel 167 (Figure 19) which passes around a drive pulley (not shown) on drive shaft 168 and the tension adjusting pulley 169 adjustably mounted on brackets 170 extending from the crossbar 127. The drive shaft 168, as illustrated in Figures 9 and 19, also drives the drive shaft 146 through gears 171 and 172, the drive shaft 168 being connected through a clutch device 173 to the sprocket 28 which is connected by the main drive chain 27 (see Figure 1).

The cross-partition depressing means 123 are adjustable vertically as illustrated in Figure 9 wherein the partition position in conjunction with the specific partition 138 is illustrated in chain lines. In Figures 9 and 19 it will be observed that the adjusting means are comprised of the manually actuable worm 174 mounted in the casting 175 carrying shafts 166 and shaft 176 and slidably mounted by the partially enclosing base portions 177 about the downwardly extending guides 178 which are part of the secondary frames 125. The worm 174 engages the gear 179a slidably keyed to the shaft 176. Gear 179a is also slidably keyed to the shaft 176 and engages the gear track 180. The shaft 176 also slidably passes through the gear 181 and is keyed thereto to cause the casting 182, also slidably receiving shaft 166, to move vertically by engagement of the gear 181 with the gear track 183. It will therefore be apparent that the simple manual rotation of the worm 174 on the one casting 175 causes corresponding movement in both the gears 179a and 181. It is essential to note that the shafts 166 and 176 must be confined in axial movement and are so limited by slidable engagement of their ends with the inner flange surfaces 184 and 185 and the angles 186 and 187 mounted on the main frame 124.

It is now relevant to discuss the operation of the units and their adjustment and to describe further structural details in conjunction with such disclosure for purposes of clarity.

*General operation and synchronization*

Figure 3 represents the unit A2 when examined in conjunction with Figures 1 and 2 since the upstanding frame thereof is shown in a position to deposit the longitudinal partition 12a in the guide means 12. In the units A only the guide means or tracks 11, 12 and 188 are fixed to the complete structure 189 supported by the cross members 199 of the frames 37. The partition 11a is shown resting in the guide 11 and in the process of being urged forwardly by the crossbar 13 having end rollers 191 riding in the angle guides 192 supported by brackets 193. Crossbar 13 is connected by brackets 194 to the endless chain 25.

The guide means of the A unit are fixed in their parallel spaced apart relation and since it is desirable that the adjustment be made for various spacings of longitudinal partitions in a final cell, such adjustments are provided in the B unit wherein the guides 17 and 18 are adjustable in their parallel spaced apart relation from the guide 35 which is the fixed central guide. Essentially therefore, in coupling a B unit to an A unit it is necessary that the central guide 188 and the A unit be aligned with the central guide 35 of the B unit. This, however, is necessary only in the case where the cell to be assembled includes a centrally disposed longitudinal partition as will be evident from the following.

A novel coupling device 15 is utilized in coupling an A unit to a B unit and the structure of this coupling unit is illustrated in Figures 15 and 16. The unit is comprised of the body 195 mounting the fixed guide 35a axially thereof in the form of rigidly parallel spaced apart side members 196 welded to the base plate 197 rigidly secured to the body plate 195. The body plate 195 carries the end plates 198 and 199 which are fixed to the body by welding or other suitable means, the plates 198 carrying the upstanding pins 200 designed to engage the strap guides 201 which preferably are formed of spring steel or the like and which overlie the ends of the guides 11 and 12 as illustrated. The straps 201 mount brackets 202 which preferably are spot welded thereto and are designed to accommodate the upstanding pins 203 of the movable plates 204. The other ends of the straps 201 are inserted within the guides 17 and 18 as illustrated.

In the B units, the guides 17 and 18 are adjustable (to be described in detail hereinafter) and as the adjustment progresses the straps 201 will be distorted causing smooth curves to be formed for accommodation of the longitudinal partitions in transferring them from an A unit to the guides of a B unit without causing breakage.

In Figure 17, a longitudinal partition is shown being urged along the guide 35 by the crossbar 13, the guides in the B units preferably being formed of the side walls 205 extending upwardly from the base insert 206. The guides 17 and 18 of the B units, however, are adjustable in their spaced apart relation relative to the guide 35 and are adjustably mounted by the threaded supporting collars 207 on the adjusting rod 208 which has the opposed threads 209 and 210. The adjusting rod 208 is mounted in brackets 211 on the longitudinal members 212 of a base frame preferably forming a part of the frame 124 of the B unit. There are two adjusting rods 208 in each B unit and each carries at its one end a sprocket (not shown) which is indicated by numeral 213 in the schematic illustration of Figure 1. Means are provided for moving of the adjusting rods simultaneously in the form of an endless chain 34 which passes over idler sprockets 214 and 215 in conjunction with any of which a hand wheel is provided (not shown).

It has been noted that the longitudinal partitions are urged continuously at a certain velocity along the guide means described throughout the length of the machine which is comprised of the plurality of units above mentioned. A single drive motor is employed for driving the complete mechanism of all units and it is necessary to synchronize the feeding operation of the B units of the cross-partitions toward the longitudinal partitions moving forwardly through the guides 17 and 18. The A units themselves are synchronized in their feeding rate with the speed of movement of the crossbars 13 by virtue of the unity ratio in the drive connection to the chains 25 of the drive chain 27 from the common shaft 23 (see Figures 1 and 2). This will be evident when it is noted that the unity drive gear box 31 drives the drive shafts 33 (see also Figure 3) and it will be realized that the number of partition selectors on the endless chains 44 must be proportioned according to the speed of the chain determined by the size of the sprockets driving the same so that the rate of selection of a longitudinal partition from the magazine is equal to the rate of passage of crossbars 13 through a particular A unit. Obviously, by virtue of the spacing between the crossbars 13, considerable latitude is allowed and therefore, synchronism presents no particular problem as regards the A units themselves. It is however, desirable that the A units feed substantially simultaneously.

Concerning synchronization of the feeding of cross-partitions by the units B, a simple and effective means of adjustment is provided in the drive relation of the cross-partition conveying means. With reference to Figure 1, it will be noted that the common chain drive 27 passes over the drive sprockets 29 of each B unit (see also Figure 14) thus controlling and actuating the magazine feed. It is desirable that a cross-partition (Figure 9a) be deposited on the supporting shoulder 135 at the instant at which a longitudinal partition arrives below it as it is conveyed in its forward movement through the guides. The gear relation of the drive of the chain feeding mechanism is similar to that discussed above with reference to the A unit so that the rate of selection of a cross-partition from the magazine is equal to the rate of passage of crossbars 13 through the unit. Insofar as timing is concerned, however, the only significant detail presenting any problem is the synchronization of the forward movement of the cross-partitions with the forward movement of the longitudinal partitions such that the cross-partition arrives at the proper final position relative to the longitudinal partitions as illustrated in Figure 18. I therefore provide means for adjusting the shaft 168 (Figures 9 and 19) independently of the main drive sprocket 28. Thus, referring to Figure 20, the sprocket 28 is shown freely mounted on the reduced diameter portion 216. A hand wheel 217 is fixed to the end of the shaft 168 as at 218 and between the hand wheel and the sprocket 28 is a clutch device 173 in the form of a hand wheel 219 thread-mounted on the threaded portion 220 of portion 216 whereby the sprocket may be locked into engagement with the shoulder 221 of the shaft 168 or may be released therefrom to allow turning of the shaft by the hand wheel 217.

Referring to Figure 9 therefore, it will be apparent that if the hand wheel 219 is released that the hand wheel 217 may be actuated by the operator to cause the shaft 168 to rotate thereby moving the cross-partition receiving members 147 to a relative position as compared with the position of longitudinal partitions resting in the guides therebelow to provide synchronism of movement between the cross-partitions and longitudinal partitions. By these simple means of adjustment alone then each B unit may be independently adjusted for synchronism and as will be observed, is simply adjustable by these means to provide for different spacings of cross-partitions longitudinally of the longitudinal partitions according to spacings of slots in the latter as between the various B units.

*Adjusting for size of partitions*

Although the drawings illustrate a machine designed to handle two longitudinal partitions with provision for a third to be placed in the guides 188 should another A unit be used, it will be appreciated that any number of guides may be mounted in the A units but that the spacings of these guides as fixed. When it is desired that the spacing between longitudinal partitions be changed for a differently dimensioned cell assembly, it is merely necessary by means of a hand wheel mounted in conjunction with any one of sprockets 213 (Figure 1) which is directly connected to any of shafts 208 to cause all of the shafts 208 to rotate simultaneously by virtue of common drive connection through chain 34 (Figure 1) thus causing a simultaneous inward or outward parallel movement of the guide means, that is to say, the guide tracks 17 and 18. Such adjustments will cause a flexing of the straps 201 of the coupling device 15 shown in Figure 15 but no detailed manual attention is required in this operation. Thus, in changing over operation of the machine so that it may handle longitudinal partitions which are to be in different parallel spaced apart relation it will only be necessary to manually rotate one of the shafts 208 (Figure 17).

In adjusting the magazines for different lengths of partition in the A units, it is merely necessary to cause rotation of the shaft 48 (see Figures 1 and 3) by a suitable hand wheel 48b to cause the upstanding frames 45 thereof to move toward or away from one another to arrive at the necessary dimensions. The A units are designed to handle various heights of partitions without adjustment by virtue of their construction to handle a maximum reasonable height.

The thickness of the partitions is compensated for by the adjustment of the cam plate 114 on the adjusting means 116 and the adjustment of the shoe strap 57 as previously described with reference to the B unit. No other adjustments of the A unit are required with the exception that the feeding dog may require adjustment in height for various heights of partition blank in the magazine and means for such adjustment have been described with reference to the upstanding brackets 60 and 61 and the sloping slots 62 and 63 thereof supporting the rods 64 at various heights as desired.

All of the adjustments above described with reference to the A unit are found also in the B unit but further adjustments are also provided in the latter. Thus the guides or guide tracks 17 and 18 are adjustable in their parallel spaced apart relation as previously described. The cross-partition feeding members 147 are adjustable in their synchronization with the movements of the longitudinal partitions through the guides therebelow. Further however, the depressing means 123 are adjustable in height as previously described for various heights of cross-partition. At the same time it must also be noted that the cross-partitions and the depressing means are adjustable in their spaced apart relation simultaneously with the adjustment of the magazine of the B unit since these elements are all assembled on a secondary frame 125 as illustrated in Figure 9 and bodily movable laterally for adjustment purposes. It will be appreciated, therefore, that where the complete machine comprised of a plurality of A units and a plurality of B units is to be changed over from handling certain sizes of longitudinal partition and cross-partition to a different size of longitudinal partition and cross-partition, a minimum number of adjustments is required which may be carried out with reference to the following adjusting means. The adjusting means for determining the width of the magazines of the A units which involves the actuation of the adjusting hand wheel 48b is the only adjustment required unless it is necessary to adjust feeding dog 68 for height in the manner formerly described. The longitudinal guides of the B units are adjusted in their spaced apart relation by manual actuation of a hand wheel on one of the shafts 208. Sloping guides 159 which are mounted at one end by the bracket 159a are adjustable by means of the hand knob 159b which holds the bracket 159a rigidly to the track 126a (Figure 9). Other adjustments of the B unit required concern the spacing of the secondary frames 125 by a hand wheel on the shaft 129 of one of the units, all being adjusted simultaneously through the chain connection 36 (Figure 1) to space the magazine components and the cross-partition receiving members and the depressing means simultaneously. The depressing means may require adjustment for height by manually actuating the worm 174 by means of a suitable wrench applied to the stud 174a (Figure 9). The synchronization of the cross-partition receiving members with the longitudinal movement of the longitudinal partitions may require adjustment which must be arranged for in each B unit by release of the clutch wheel 219 (Figure 20) and manual turning of the shaft 168 by the hand wheel 217 in the manner formerly described. As with the units A the feeding dogs of the magazines of the B units may require adjustment in height. It will be apparent that these various adjustments are simple and are a minimum as regards the complete machine and that they may be accomplished without any disassembly operations but may be carried out directly.

*Alternatives*

It will be apparent that the present machine comprised of a plurality of units is evolved about the principle of assembling cross-partitions with longitudinal partitions as illustrated in Figure 18 where the cross-partition has the same forward velocity as the longitudinal partitions and has another velocity causing the same to move into nesting engagement with the forwardly moving longitudinal partitions. Also the longitudinal partitions have a through path through the machine whereby straight-line production in the assembly operations is accomplished. The specific form of the A units and B units illustrated is that preferred for the functions illustrated but many alternatives will be apparent to skilled persons with regard to specific details. Thus, I prefer to have the guides 11, 12 and 188 shown in Figure 3 fixed in the A units since this leads to simplicity in the adjustments required and such advantages are capable by virtue of the incorporation of the coupling device 15 between the last A unit and the first B unit. It will be noted that in the A units a presser strap 58 (Figure 8) has been illustrated as a means for controllably restraining the too rapid descent of the partition 12a. The same type of device of more limited length may be employed in conjunction with the feeding of cross-partitions from the magazine 16 of units B but in this instance I prefer to employ the alternative illustrated concerning the use of an air pressure nozzle 16a pivotally mounted as at 16b and having the adjusting means 16c whereby the same may be disposed to direct a blast of air against the face of a cross-partition resting on the abutments 135 (Figure 9a) to hold the same upright until a cross-partition receiving member carries it away. It has been noted that the sloping guides 159 are preferred only in conjunction with the first B unit but obviously this requirement is dependent upon the character of the relative heights of the cross-partitions and longitudinal partitions. Some means for holding the longitudinal partitions upright with the desired accuracy is required before the first cross-partition is inserted so that the mating slots of the partitions will be aligned at the beginning of the assembly operation. However, once the longitudinal partitions have received one cross-partition the latter holds them sufficiently rigid so that the sloping guides are not required in the following assembly operations carried out by the remaining B units. It will also be apparent that the sloping guide means 159 cannot be used in following B units unless the longitudinal partitions are of greater height than the cross-partitions and are designed to extend above them after assembly therewith. Obviously a number of A units and a number of B units employed in any one assembly in a shop should be governed by the maximum number of units required to assemble a cell of the largest number of partitions in the ordinary course. To assemble a carton of any number of lesser partitions, it is merely necessary to eliminate feeding partitions from magazines of certain of the units but they may continue in their mechanical movement, if desired, without interfering with the assembly operations. If, however, it becomes necessary to add further units to the machine, this may simply be accomplished with a minimum of delay and by reason of this factor the machine as a whole possesses the utmost in flexibility.

It will be apparent that I have provided a method of assembling a longitudinal partition with a cross-partition of the character illustrated which is distinctive in that one of the partitions is moved along a certain path at a certain velocity and the other partition is moved along another path at another velocity. These two paths of movement are directed to intersect at a point corresponding to the desired location of the assembly portion of one partition with the other. The velocity of the other partition at the intersection of the two paths is a velocity, termed a resultant velocity, which is comprised of two components. One of these components is a velocity of movement of the same magnitude and in the same direction as the certain velocity of the first partition and the other velocity of movement is defined in direction by the movement of one partition toward the other and it may be of any magnitude depending upon the characteristics of the partitions employed for the assembly operation. In Figure 18 the partitions 19 are shown proceeding forward at a certain velocity and along a certain path. The partition 20 is shown proceeding along another path having a velocity Z made up of the two components X and Y previously described. As regards the velocity X of the partition 20, however, it is essential that it be equal to the forward velocity of the partitions 19 at the point of assembly illustrated by the position of the components shown in bold lines in Figure 18.

What I claim as my invention is:

1. In apparatus for assembling longitudinal partitions with cross-partitions to form a packing cell wherein the partitions are notched inwardly from at least one edge thereof so that a portion of the material of each partition is caught in the corresponding notch of the intersecting partition; a cross-partition feeding unit comprising a magazine, means for selecting a cross-partition from said magazine, supporting means for supporting a selected partition, conveying means designed to engage the ends of a supported partition and carry the same away from said supporting means, means for conveying longitudinal partitions in parallel spaced apart relationship with their notched edges free longitudinally of said unit and at a certain velocity, said conveying means being designed to convey said cross-partition transversely of the longitudinal partitions and in the same direction of movement at the same velocity, depressing means for positively urging the cross-partition as it is conveyed toward the longitudinal partitions and comprising, an inclined frame piece, means adjustably mounting said inclined frame piece whereby the same may be adjusted for controlling the assembly of various sizes of cross-partitions with various sizes of longitudinal partitions, and means mounted on said frame for engaging an edge of a cross-partition to cause the latter to move in a direction toward the longitudinal partitions.

2. In apparatus for assembling longitudinal partitions with cross-partitions to form a packing cell wherein the partitions are notched inwardly from at least one edge thereof so that a portion of the material of each partition is caught in the corresponding notch of the intersecting partition; a cross-partition feeding unit comprising a magazine, means for selecting a cross-partition from said magazine, supporting means for supporting a selected partition, conveying means designed to engage the ends of a supported partition and carry the same away from said supporting means, means for conveying longitudinal partitions in parallel spaced apart relationship with their notched edges free longitudinally of said unit and at a certain velocity, said conveying means being designed to convey said cross-partition transversely of the longitudinal partitions and in the same direction of movement at the same velocity, depressing means for positively urging the cross-partition as it is conveyed toward the longitudinal partitions and comprising, an inclined frame piece, means adjustably mounting said inclined frame piece whereby the same may be adjusted for controlling the assembly of various sizes of cross-partitions, and an endless belt mounted on said frame for engaging an edge of a cross-partition to cause the latter to move in a direction toward the longitudinal partitions.

3. In apparatus for assembling longitudinal partitions with cross partitions to form a packing cell wherein the partitions are notched inwardly from at least one edge thereof so that a portion of the material of each partition is caught in the corresponding notch of the intersecting partition; a cross-partition feeding unit comprising a magazine, means for selecting a cross-partition from said magazine, supporting means for supporting a selected partition, conveying means designed to engage the ends of a supported partition and carry the same away from said supporting means, means for conveying longitudinal partitions in parallel spaced apart relationship with their notched edges free longitudinally of said unit and at a certain velocity, said conveying means being designed to convey said cross-partition transversely of the longitudinal partitions and in the same direction of movement at the same velocity, depressing means for positively urging the cross-partition as it is conveyed toward the longitudinal partitions and comprising, an inclined frame piece, means adjustably mounting said inclined frame piece whereby the same may be adjusted for controlling the assembly of various sizes of cross-partitions with various sizes of longitudinal partitions, an endless belt mounted on said frame for engaging an edge of a cross-partition to cause the latter to move in a direction toward the longitudinal partitions, and means for moving a partition engaging loop of said belt in the same direction as the direction of movement of the cross-partition.

4. In apparatus for assembling longitudinal partitions with cross-partitions to form a packing cell wherein the partitions are notched inwardly from at least one edge thereof so that a portion of the material of each partition is caught in the corresponding notch of the intersecting partition; a cross-partition feeding unit comprising, a main frame, guide means on said frame designed to slidably accommodate longitudinal partitions and disposed longitudinally of said unit, a pair of secondary frames adjustably mounted within said main frame in parallel spaced apart relationship longitudinally of the unit, means for adjusting the parallel spaced apart relationship of said secondary frames, magazine components of said secondary frames forming a magazine for the cross-partitions, selecting means on said secondary frames for selecting one cross-partition at a time from said magazine, supporting means on said frames for supporting the ends of a cross-partition after selection from said magazine, conveying means on each of said frames for conveying a cross-partition from said supporting means in the same direction and velocity of movement as the movement of longitudinal partitions in said guides, and means for positively urging a cross-partition conveyed by said conveying means in another direction of movement toward said longitudinal partitions.

5. In apparatus for assembling longitudinal partitions with cross-partitions to form a packing cell wherein the partitions are notched inwardly from at least one edge thereof so that portion of the material of each partition is caught in the corresponding notch of the intersecting partition; a cross-partition feeding unit comprising, a main frame, guide means on said frame designed to slidably accommodate longitudinal partitions and disposed longitudinally of said unit, a pair of secondary frames adjustably mounted within said main frame in parallel spaced apart relationship longitudinally of the unit, means for adjusting the parallel spaced apart relationship of said secondary frames, magazine components of said secondary frames forming a magazine for the cross-partitions, selecting means on said secondary frames for selecting one cross-partition at a time from said magazine, supporting means on said frames for supporting the ends of a cross-partition after selection from said magazine, conveying means on each of said frames for conveying a cross-partition from said supporting means in the same direction and velocity of movement as the movement of longitudinal partitions in said guides, means for positively urging a cross-partition conveyed by said conveying means in another direction of movement toward said longitudinal partitions, and means for synchronizing said cross-partition conveying means with the movement of longitudinal partitions in said guide means to align a conveyed cross-partition with the mating notches of the longitudinal partitions with which it is to be assembled.

6. In apparatus for assembling longitudinal partitions with cross-partitions to form a packing cell wherein the partitions are notched inwardly from at least one edge thereof so that a portion of the material of each partition is caught in the corresponding notch of the intersecting partition; parallel spaced apart longitudinally extending guide means; a plurality of longitudinal partition feeding units fixedly mounting said guide means, each being designed to deposit a longitudinal partition in one of said guides, a plurality of longitudinally extending adjustable parallel spaced apart guide means designed to form a continuation of said former guide means and to accommodate longitudinal partitions, a plurality of cross-partition feeding mechanisms, each being designed to feed a cross-partition transversely toward said adjustable guide means, a partition magazine in each longitudinal partition feeding unit and in each cross-partition mechanism, said magazines supporting the partitions in a planar position parallel to the final planar positions of said partitions when assembled into a packing cell in said apparatus.

7. In apparatus for assembling longitudinal partitions with cross-partitions to form a packing cell wherein the partitions are notched inwardly from at least one edge thereof so that a portion of the material of each partition is caught in the corresponding notch of the intersecting partition; parallel spaced apart longitudinally extending guide means, a plurality of longitudinal partition feeding units fixedly mounting said guide means, each being designed to deposit a longitudinal partition in one of said guides, a plurality of longitudinally extending adjustable parallel spaced apart guide means designed to form a continuation of said former guide means and to accommodate longitudinal partitions, a plurality of cross-partition feeding mechanisms, each being designed to feed a cross-partition transversely toward said adjustable guide means, a partition magazine in each longitudinal partition feeding unit and in each cross-partition mechanism, said magazines supporting the partitions in a planar position parallel to the final planar positions of said partitions when assembled into a packing cell in said apparatus, and a coupling unit for coupling the fixed guide means to the adjustable guide means comprising, a rigid body, upstanding spaced apart members on one end of said body, a movable plate slidably resting on said body, and deformable guide straps mounted at their one end between said upstanding members and designed to overlie the ends of a fixed guide, the other ends of said straps being designed to be inserted between the ends of a corresponding movable guide, and means for mounting said deformable straps on said movable plate.

RICHARD C. MERRY.

REFERENCES CITED

The following references are of record in the file of this patent:

UNITED STATES PATENTS

| Number | Name | Date |
|---|---|---|
| 276,497 | Stocking | Apr. 24, 1883 |
| 871,330 | Ethridge | Nov. 19, 1907 |
| 1,058,314 | Lynch | Apr. 8, 1913 |
| 1,491,461 | Buccicone | Apr. 22, 1924 |
| 1,523,652 | La Bombard et al. | Jan. 20, 1925 |
| 1,996,812 | Jensen et al. | Apr. 9, 1935 |
| 2,178,783 | Egger | Nov. 7, 1939 |
| 2,252,469 | Nyberg | Aug. 12, 1941 |
| 2,353,842 | McLaughline et al. | July 18, 1944 |